(12) United States Patent
Mukhedkar et al.

(10) Patent No.: US 11,770,005 B2
(45) Date of Patent: Sep. 26, 2023

(54) FAULT HANDLING

(71) Applicant: GENERAL ELECTRIC TECHNOLOGY GMBH, Baden (CH)

(72) Inventors: Radnya Anant Mukhedkar, Stafford (GB); Chandra Mohan Sonnathi, Stafford (GB)

(73) Assignee: General Electric Technology GmbH, Baden (CH)

( * ) Notice: Subject to any disclaimer, the term of this patent is extended or adjusted under 35 U.S.C. 154(b) by 112 days.

(21) Appl. No.: 16/971,744

(22) PCT Filed: Feb. 12, 2019

(86) PCT No.: PCT/EP2019/053450
§ 371 (c)(1),
(2) Date: Aug. 21, 2020

(87) PCT Pub. No.: WO2019/162148
PCT Pub. Date: Aug. 29, 2019

(65) Prior Publication Data
US 2020/0395757 A1 Dec. 17, 2020

(30) Foreign Application Priority Data

Feb. 23, 2018 (EP) ..................................... 18158307

(51) Int. Cl.
*H02J 3/36* (2006.01)
*H02H 3/02* (2006.01)
*H02H 3/08* (2006.01)

(52) U.S. Cl.
CPC ............... *H02J 3/36* (2013.01); *H02H 3/021* (2013.01); *H02H 3/083* (2013.01)

(58) Field of Classification Search
CPC .................................. H02H 3/083; H02J 3/36
See application file for complete search history.

(56) References Cited

U.S. PATENT DOCUMENTS 3,505,567 A * 4/1970 Peterson .................. H02H 3/06
361/67
3,599,076 A * 8/1971 Boksjo ................. H02H 7/1257
363/53

(Continued)

OTHER PUBLICATIONS

Bolduc, et al.: "Development of a DC Current-Blocking Device for Transformer Neutrals", IEEE Transactions on Power Delivery, vol. 20, No. 1, Jan. 2005, pp. 163-168.

(Continued)

*Primary Examiner* — Peter M Novak
(74) *Attorney, Agent, or Firm* — Eversheds Sutherland (US) LLP

(57) ABSTRACT

This application relates to methods and apparatus for handling a fault associated with a voltage source converter (VSC) for exchanging electrical power between an AC system (101, 102) and a DC system (106-1, 106-2). The VSC (104) is connected to the AC system via an interface apparatus, comprising a transformer (107) with a set of primary windings (202) for coupling to a plurality of AC phases (A, B, C) of the AC system. In embodiments of the disclosure the set of primary windings having a neutral point (N) and the interface apparatus includes a fault module (301) having an energy storage element (302) connected in parallel with a resistive element (303) between the neutral point of the set of primary windings and a reference voltage, such as ground. The fault module does not interfere with normal operation but in the event of a phase-to-ground fault on the secondary side of the transformer, can induce earlier zero-crossing in the AC phases than otherwise would be the case, thus allowing AC breaker (108) to open with a reduced arcing time.

12 Claims, 5 Drawing Sheets

(56) References Cited

U.S. PATENT DOCUMENTS

| | | | | |
|---|---|---|---|---|
| 5,179,489 A * | 1/1993 | Oliver | ............... | H02H 3/00 |
| | | | | 361/111 |
| 5,666,277 A | 9/1997 | Bjoerklund | | |
| 2009/0296289 A1* | 12/2009 | Valdez | ............... | H02H 3/17 |
| | | | | 361/47 |
| 2012/0019965 A1 | 1/2012 | Faxvog | | |
| 2013/0070491 A1 | 3/2013 | Jiang-Haefner | | |
| 2018/0226796 A1* | 8/2018 | Anderson | ............ | H02H 3/05 |
| 2019/0371542 A1* | 12/2019 | Lindell | ............ | H01H 33/60 |

OTHER PUBLICATIONS

International Search Report of PCT/EP2019/053450 dated May 8, 2019.

European Search Report for Application No. 18158307.1 dated Sep. 21, 2018.

* cited by examiner

FAULT HANDLING

CROSS-REFERENCE TO RELATED APPLICATIONS

This application is a U.S. National Stage Application under 35 U.S.C. 371 and claims the priority benefit of International Application No. PCT/EP2019/053450 filed Feb. 12, 2019, which claims priority to EP18158307.1, filed Feb. 23, 2018, which are both incorporated herein by reference.

The present disclosure relates to methods and apparatus for fault handling, and in particular to methods and apparatus for handling faults in connections between AC and DC systems and especially handling faults associated with voltage source converters.

Conventionally, distribution and transmission of electrical power has mainly been achieved through the use of alternating current (AC) distribution schemes, in particular high voltage AC distribution systems. Increasingly, direct current (DC) systems, and in particular HVDC (high-voltage direct current) are being proposed for some electrical power transmission applications. There can be a number of benefits to using HVDC electrical power.

In order to use HVDC electrical power transmission, it is typically necessary to convert AC electrical power to DC and back again. Thus a DC system may be coupled to one or more AC systems, with at least one converter station at each interface between an AC system and the DC system.

Historically HVDC systems were implemented with line-commutated-converters in the converter stations, which make use of elements such as thyristors that may be controllably turned-off but which then remain conducting as long as they are correctly biased by the line voltage. However developments in the power electronics field have led to an increased use of voltage-source converters (VSCs) for AC-DC and DC-AC conversion. VSCs make use of switching elements, typically insulated gate bipolar transistors (IGBTs) that can be controllably turned on and off, connected with respective anti-parallel diodes.

Typically a VSC will have a phase limb for each electrical phase of the AC system. Typically the AC system will be a three-phase electrical system. An AC node of each converter arm may be connected to the respective AC phase of the AC system via a transformer having a set of primary windings electrically connected to the AC system and a set of secondary windings electrically connected to the phase limb of the VSC.

Each phase limb may be coupled to the DC system at respective high-side and low-side DC terminals, e.g. between high-side and low-side DC busbars. A phase limb will typically comprise a plurality of converter arms, with each converter arm extending between the AC node and a defined nominal DC voltage. In a symmetric monopole arrangement a phase limb may have two converter arms, a high-side converter arm extending between the AC node and the high-side DC terminal and a low-side converter arm extending between the AC node and the low-side DC terminal. In a bipole arrangement two converter arms may be arranged between the high-side DC terminal and a reference potential, e.g. ground, with an AC node at a midpoint of the two arms. A further two converter arms may be located between the reference potential and the low-side DC terminal. Each converter arm includes a switching apparatus, referred to as a valve. In some VSC designs, such as the modular-multilevel converter (MMC) or alternate-arm-converter (AAC), the valve may be at least partly formed from a series connection of a plurality of cells, each cell having an energy storage element such as a capacitor that can be selectively connected in series between the terminals of the cell or bypassed. The valves can be used for voltage wave-shaping and can allow conversion between AC and DC with relatively low distortion.

In certain VSC designs, circuit breakers in, or coupled to, the AC system, i.e. connected on the primary winding side of the transformer, act as the primary protection in the event of a fault being detected in the AC system or the VSC. AC circuit breakers capable of operating in high voltage systems typically include a mechanical disconnect switch, with two electrical contacts that are movable with respect to one another. In normal operation the switch is closed and the two electrical contacts are in physical contact with one another to provide a conductive path with low on-resistance. In the event of the fault the switch is opened and one contact is moved with respect to the other to break physical contact and prevent conduction. However the switch takes some time to open and, due to the high voltages involved, when the two electrical contacts have physically disconnected but are still close to one another the electric field between the contacts may be very high and above the breakdown voltage of the medium between the contacts, e.g. air. If the circuit breaker is opened when current is flowing through the circuit breaker, arcing between the contacts can occur and, once arcing has been established, the arc may be sustained as long as current continues to flow to the circuit breaker.

In AC systems, the current normally naturally crosses zero twice in each cycle. When the AC current drops to zero the arcing ceases. However in certain fault scenarios that may occur within a HVDC converter station, the fault current through the circuit breaker may not have a zero crossing, at least for several AC cycles. This means that the current in those phases may have a delayed zero crossing, or may never cross zero at all, meaning that the AC circuit breakers may not operate effectively and may suffer a sustained arcing duration.

Patent publications US2013/0063989 and US2014/0268942 both address this problem and describe an interface arrangement for coupling between an AC system and a DC system. Both of these documents disclose use of additional switchgear, i.e. elements that are actively controlled in the event of the fault, to provide a short-circuit to ground, either on the secondary side of the transformer as described in US2013/0063989, or via an additional set of windings of the transformer as described in US2014/0268942. The additional switchgear is disadvantageous as it increases the footprint and cost of the VSC and also brings an additional variable that the time taken to clear a fault depends on the speed of the additional switchgear. WO2016066196 also addresses the problem with a control based solution, without the need for additional switchgear. However, the proposed solution relies on delaying the breaker opening time, which thus disadvantageously increases the duration of the fault. An alternative solution would therefore be advantageous.

Embodiments of the disclosure relate to improvements in fault handling in response to a fault.

Thus, in one aspect there is provided an interface apparatus for interfacing between an AC system and a DC system, the apparatus comprising:
   a transformer having a set of windings for coupling to a plurality of AC phases of the AC system, the set of windings having a neutral point; and
   a fault module comprising an energy storage element connected in parallel with a resistive element between a first module node and a second module node;

the first module node being electrically connected to the neutral point of the set of windings and the second module node connected to a reference node held, in use, at a reference voltage.

During normal operation the voltage at the neutral point of the set of primary windings remains balanced and the fault module does not have any substantial impact on normal operation. In the event of a fault of the type discussed above, AC circuit breakers in series with the AC phases may be commanded to open. As noted above one AC phase will be expected to have a zero crossing of current and thus the relevant circuit breaker will open successfully in a relatively short time, but there may be a significant DC components of fault current in at least one of the other phases. In embodiments of the disclosure however once the AC circuit breaker for one phase has opened there will be an imbalance at the neutral point. A current can thus flow to or from the energy storage element. This current flow induced by the fault module influences the fault current profile in the other AC phases such that the remaining AC phase will be expected to experience a zero crossing of current earlier than otherwise would be the case. The interface apparatus of embodiments thus allows all AC breakers to be commanded to open in the event of a fault, thus providing a simple control method, but provides quicker opening of all AC circuit breakers with reduced arcing time.

The fault module may further comprises a surge arrestor electrically connected between the first and second module nodes in parallel with said energy storage element and said resistive element. The energy storage element may comprise at least one capacitor.

The interface apparatus may further comprise a respective AC circuit breaker for each of the AC phases of the AC system and a fault controller for operating said AC circuit breakers in the event of a fault.

The said of windings of the transformer to which the fault module is coupled may be a primary set of windings, in other words the fault module is located on the primary winding side of the transformer.

The interface apparatus may further comprise a set of secondary windings of the transformer for coupling to a plurality of phase limbs of a voltage source converter.

The fault controller may be configured to command the AC circuit breakers to open in the event of any of: a phase-to-ground fault in any of: the set of secondary windings; a phase limb of the voltage source converter or the connection between the set of secondary windings and a phase limb of the voltage source converter. In the event of such a fault the fault controller may be further configured to send a command to block the voltage source converter.

The energy storage element and resistive element of the fault module may be configured such that, with one of the AC circuit breakers open, the energy storage elements sources or sinks a current which is sufficient to modify the current profiles of the various phases so as to cause a zero-crossing of current in at least one of the other phases such that each AC breaker can be opened without a substantial increase in arcing time.

The voltage source converter may be configured as part of a bipole power transmission system and/or as part of a high-voltage direct-current (HVDC) power transmission system.

In another aspect there is provided a method of fault handling for a power distribution network, the method comprising:
during normal mode of operation, operating a voltage source converter to exchange electrical power with an AC system having multiple electrical phases via an interface apparatus, the interface apparatus comprising a transformer comprising a set of primary windings connected to the electrical phases of the AC system and a set of secondary windings connected to the voltage source converter;
wherein the interface apparatus further comprises a fault module comprising an energy storage element connected in parallel with a resistive element between a reference voltage and a neutral point of one of the set of primary windings or the set of secondary windings;
the method further comprising monitoring for a fault and, upon detecting a fault, generating a command to open a respective AC circuit breaker for each of the phases of the first AC system.

The interface apparatus may be implemented in as any of the variants discussed above. The fault may be a phase-to-ground fault in any of: the set of secondary windings; a phase limb of the voltage source converter or the connection between the set of secondary windings and a phase limb of the voltage source converter. In the event of such a fault the method may further comprise generating a command to block the voltage source converter.

As noted above the fault module may further comprises a surge arrestor electrically connected in parallel with said energy storage element and said resistive element.

The invention will now be described by way of example only, with reference to the accompanying drawings, of which:

Figure 1:
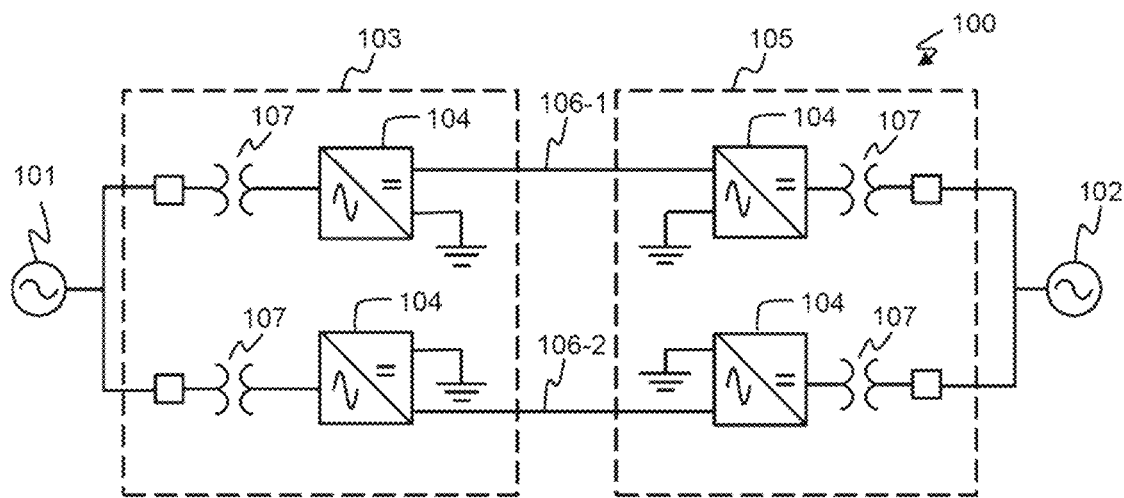
FIG. 1 illustrates one example of a power transmission network.

FIG. 1 shows one example of a power transmission network 100 using HVDC. The network 100 shown in FIG. 1 comprises a DC system connected between two AC systems 101 and 102; however, it should be understood that embodiments may be implemented in any or a variety of types of AC/DC coupling in power transmission systems.

The power network 100 comprises a first AC system 101. The first AC system 101 may comprise any electrical AC system and could for instance be a power source such as a wind farm, hydroelectric station or other AC power generator, or could be an AC network or grid for power distribution/transmission. The first AC system 101 is connected to a first converter station 103 which comprises at least one voltage source converter (VSC) 104 for converting from AC to DC or vice versa. The first converter station 103 is connected to a second converter station 105 via DC transmission lines or poles 106-1 and 106-2. The second converter station 105 also comprises at least one VSC 104 for converting between AC and DC or vice versa and the second converter station 105 is coupled to the second AC system 102, which could be a separate AC transmission/distribution grid or which could be a different part of the same AC network as the first AC system 101.

FIG. 1 illustrates a bipole arrangement in which each of the first and second converter stations 103 and 105 has a pair of VSCs 104, one connected to one pole of the DC system, e.g. connected to a high-side transmission line 106-1 and the other connected to a second pole of the DC system, e.g. connected to a low-side transmission line 106-2 (although sometimes the two VSCs can be seen as positive and negative halves of one bipole VSC. For clarity this description will refer to the bipole arrangements as having two VSCs). Each VSC 104 may be connected, on the DC side, to the relevant DC pole and also a defined DC voltage such as ground. In such a bipole system each VSC 104 is coupled to the respective AC system 101 or 102 and thus there are two AC arms connecting the converter station 103 or 105 to the respective AC system 101 or 102. It will be understood that other arrangements are possible however. For example in a symmetrical monopole scheme each converter station 103 and 105 may comprise a single VSC 104 connected on the DC side between high-side and low-side DC terminals, e.g. between lines 106-1 and 106-2, which a single AC arm connecting to the respective AC system. Embodiments may be implemented in any type of HVDC scheme.

In practice, the AC system comprises multiple electrical phases, and typically three phases, and thus each AC arm comprises paths for each of the phases.

The converter station 103 or 105 is connected to the AC system 101 or 102 via a transformer 107 having a set of primary windings connected to the AC system, and a set of secondary winding connected to respective phase limb of the converter apparatus 104. An AC circuit breaker system 108 is connected in each AC arm, which is operative under the control of a fault controller (not illustrated in FIG. 1) to break the circuit and stop current flow in the event of a fault being detected.

Figure 2:
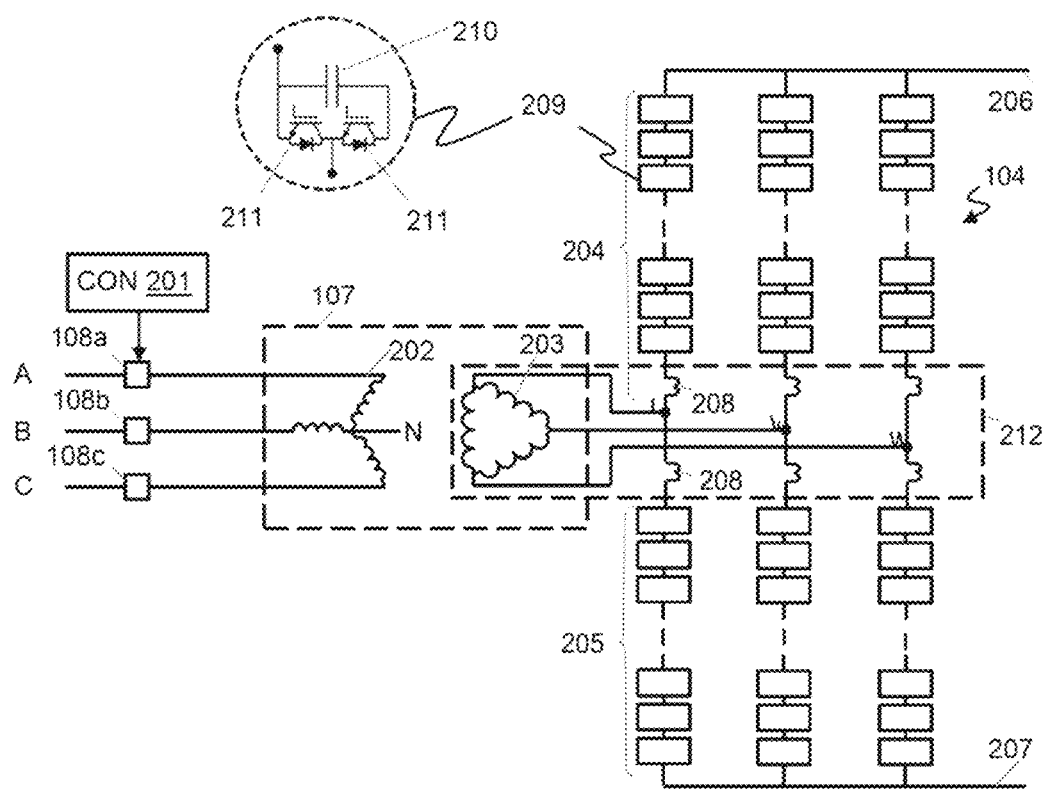
FIG. 2 illustrates one example of a conventional connection of a VSC between an AC system and a DC system.

FIG. 2 illustrates the structure of a VSC 104 of one of the converter stations 103 or 105 and a conventional connection of the VSC 104 to the AC system 101 or 102 in more detail, in which similar components as discussed with reference to FIG. 1 are identified with the same reference numerals.

FIG. 2 illustrates (on the left-hand side) a connection to the AC system, and in particular shows the multiple phase components of the AC system, labelled A, B and C. Each phase is input to a respective AC circuit breaker 108a, 108b, 108c (collectively 108), each of which receives and is controlled by a control signal from a fault controller 201. The fault controller 201 is illustrated as a separate controller forming part of the converter station 103 or 105, but in some instances at least part of the functionality of the fault controller may be provided by other components within the wider power network 100.

Each of the AC phases A, B and C is then coupled to the transformer 107. The transformer 107 is operative to transform the voltage of the AC system to a value required for operation of the VSC 104. The transformer comprises a set of primary windings 202, coupled to AC system via the breakers 108, and a set of secondary windings 203 coupled to the phase limbs of the VSC 104. In the illustrated embodiment, the set of primary windings 202 is in a wye configuration with a neutral point N, while the set of secondary windings 203 is in a delta configuration. The neutral point N may be connected directly to ground, or via a limitation element such as an impedance or a surge arrestor. A "wye-delta" configuration arranged in this way can provide some advantages, such as preventing third-harmonic currents from flowing in the supply line. However, alternative configurations may be used in some implementations.

Each of the transformed AC phases is connected to the respective phase limbs of a converter apparatus 104. In the illustrated embodiment, the converter apparatus 104 is a voltage source converter (VSC), and in general the VSC 104 may be any type of VSC, such as a half-bridge modular multi-level converter (HB MMC) as illustrated.

The VSC 104 comprises respective upper converter arms 204 and lower converter arms 205. The upper converter arm 204 for a phase limb is connected between an AC node for that phase and a high side DC bus 206 and the lower converter arm 205 is connected between the AC node and a low side DC bus 207. For a bipole configuration one of the high-side or low-side DC bus may be connected to a reference potential, e.g. ground, and the other DC bus may be connected to one of the DC lines 106-1 or 106-2.

Each converter arm 204 or 205 may comprises a series-connected inductor 208 and one or more switching cells 209 also arranged in series. In some VSC designs, such as the Modular-multilevel-converter (MMC) the cells 209, may as illustrated, comprise an energy storage element such as a capacitor 210 and a switches, such as IGBTs 211, that can be controlled to connect the capacitor in 210 in series between the terminals of the cell or connect the terminals in a path that bypasses the capacitor. A series connection of such cells, sometime referred to as a chain-link circuit or chain-link converter, allows the cells to be collectively controlled to provide voltage wave-shaping across the converter arm, allowing for efficient conversion between AC and DC with relatively low levels of harmonic distortion.

In use, a fault may develop within a converter station 103 or 105. One fault type is a single-phase-to-ground fault, in which one of the AC phases shorts to ground. In the event of detection of such a fault the fault controller 201 may generate an open command for the AC circuit breakers 108.

As noted above the AC circuit breakers 108 operate by rapidly separating two contacts, that are in physical contact in the normal closed state. As the contacts start to separate the high voltages and currents involved may mean that an electric field develops which is sufficient to ionise the gas or other medium surrounding the contacts, e.g. air, and arcing may start. Once arcing starts it may be sustained as long as current is still supplied to the AC circuit breaker and may only be extinguished by a zero crossing of current.

An issue can arise if the phase-to-ground fault occurs in a part of the VSC 104 and its connection to the AC system illustrated by the dashed box 212 in FIG. 2. This part of the converter station includes the set of secondary windings 203 of the transformer 107, the inductors 208 in each arm 204, 205 of the converter 104, and all connections there-between. In general, the highlighted area 212 includes all components between the secondary windings 203 and the cells 209 of each converter arm 204 or 205.

If such a phase-to-ground fault occurs in this part of a converter station 103 or 105, it can cause a significant fault current to flow within that phase on the secondary side of the transformer 107, i.e. on the VSC side of the transformer. This, in turn, can result in a significant injection of DC current into one or two of the phases A, B, C, on the primary side of the transformer 107. This DC current provides an offset to the AC current flowing in that phase. Thus, at the time of the normal zero crossing of current for the AC waveform, there may still be a DC current component flowing. An actual zero-crossing of current in the AC phase on the primary side of the transformer 107, and hence flowing through the respective AC circuit breaker 108 for that phase, may be delayed until later in the AC cycle, or may not occur for several AC cycles or in some cases there may no zero crossing at all. This creates a serious problem for the correct functioning of the AC breakers 108, as the circuit breakers rely on a zero crossing of current to extinguish any arcing and thus open successfully to halt current flow.

In general one phase of the AC system may still experience a zero crossing in current in the event of a phase-to-ground fault. If the relevant phase can be identified then a command to open the AC circuit breaker 108a-c of the relevant phase could be generated. Once that AC circuit breaker has successfully opened, the current across this phase is successfully extinguished, thus isolating that AC phase from the VSC 104. This will result in the currents in the remaining phases being reduced. The driving voltage in the faulty phase is reduced and therefore the DC components of current in the remaining phases will start to reduce and may start to experience zero crossings.

The AC circuit breakers 108 may therefore be commanded to open upon detection of a fault and one AC circuit breaker successfully opening may allow the other AC circuit breakers to open once the current has dropped enough for zero crossings to occur. However there will be a delay between the opening time of the first AC circuit breaker and the fault current components dropping sufficiently that all remaining AC circuit breakers are successfully opened. This delay time can put added strain on the AC circuit breakers 108 as the breakers experience a longer arcing time during the time delay until the zero-crossings occur. To avoid undue arcing times the AC circuit breakers could be commanded to open is a staggered manner, at times when it is determined that a zero crossing for that phase is likely to occur. This may mitigate the amount of arcing time for each AC circuit breaker but requires a relatively complex control scheme. In any case this delay allows more time for any fault current to interact with various components, e.g. of the VSC 104 or connections there-to, thus allowing more of chance for damage of the components to occur.

Embodiments of the present disclosure mitigate this problem through use of an interface apparatus which includes a fault module coupled to the set of primary windings of the transformer. The fault module is connected between the neutral point of the set of primary windings and a reference potential, which may be ground potential.

Figure 3:
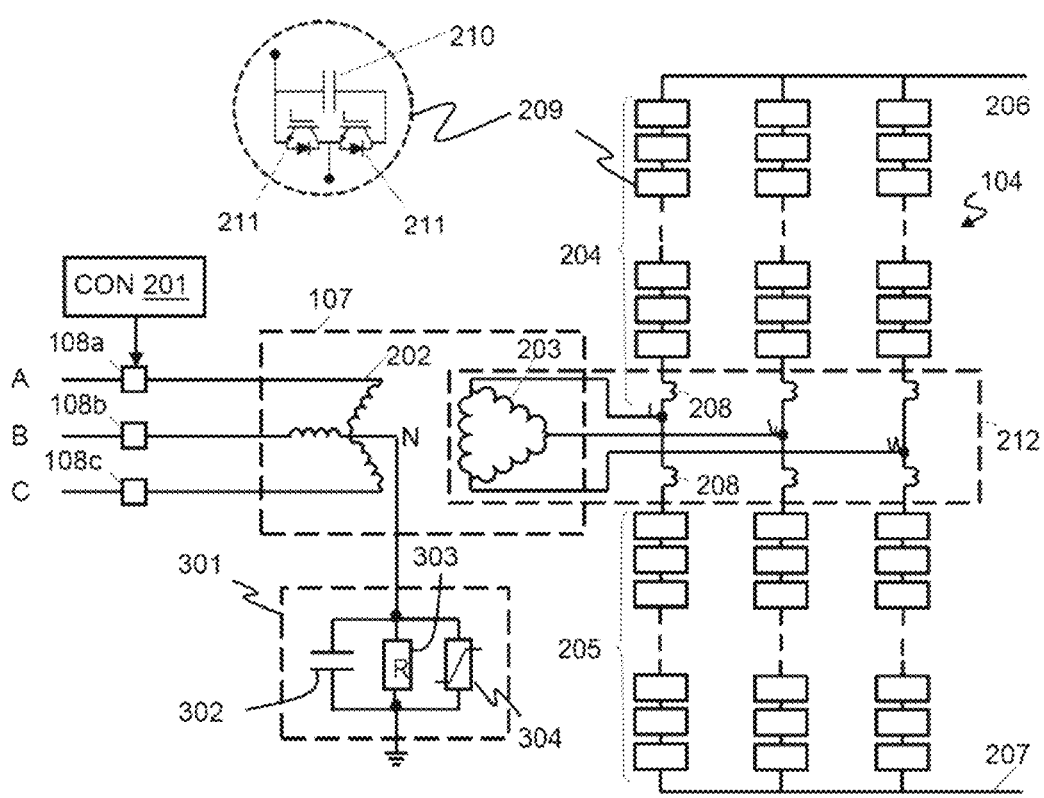
FIG. 3 illustrates an example of a connection of a VSC between an AC system and a DC system including an interface apparatus according to an embodiment.

FIG. 3 illustrates a VSC and connections to an AC system that includes an interface apparatus according to an embodiment of the disclosure, in which similar components to those illustrated in FIGS. 1 and 2 are identified by the same reference numerals.

FIG. 3 again illustrates a VSC 104 coupled to three phases A, B and C of an AC system via a transformer 107. In this embodiment however the transformer 107 has a fault module 301 connected thereto. The fault module 301 comprises an energy storage element 302 electrically connected in parallel with a resistive element 303 between first and second module nodes. In the embodiment illustrated in FIG. 3 the energy storage element comprises at least one capacitor 302. The first module node of the fault module 301 is connected to the neutral point of the set of primary windings 202. The second module node is connected to a reference node at a reference potential, which in normal operation is the same potential as the neutral point of the primary windings in this example ground. In some embodiments the fault module further comprises a surge arrestor 304 connected electrically in parallel with the resistive element 303 and energy storage element 302.

The fault module 301 in the embodiment of FIG. 3 is thus connected to the primary side of the transformer 107. In some instances however the fault module could instead be connected to a neutral point of a set of secondary windings of the transformer to provide the same general advantages as described herein. The fault module 301 comprises purely passive components and does not need any components such as switches or the like which require active control.

During normal non-faulted operation, with all the phases A, B and C connected to the primary windings 202, the voltage from all the phases will be balanced appropriately. Thus the voltage at the neutral point N of the primary set of windings 202 will be substantially the same as the reference potential and thus the presence of the fault module will not substantially affect normal operation.

However in the event of a phase-to-ground fault in the part 212 of the VSC 104, transformer secondary windings 203 or the connections there-between, the presence of the components of the fault module can reduce the time required to open all the AC circuit breakers 108.

In the event of such a fault, the fault controller 201 may issue an open command to all of the AC circuit breakers 108. As noted above, in such a phase-to-ground fault there may be a DC current component imposed on one or more of the AC phases. However at least one AC phase will still experience zero crossings in current at the usual intervals for the AC waveform. Thus one of the AC circuit breakers 108a-c will open successfully in a relatively short period of time, isolating that phase from the VSC.

Opening of one of the circuit breakers 108a-c, effectively removing the contribution of one phase, will affect the voltage at the neutral point N of the primary windings 202. The voltage at the neutral point is no longer balanced between all the phases and a non-zero voltage will be developed across the energy storage element, e.g. capacitor 302, and resistive component 302. This voltage induces a current to flow to/from capacitor 302. This current also flows in the AC phases in which the AC circuit breakers have not yet opened. This provides a modulation of the current profile in such phases that at least partly offsets the impact of the fault current component. As such this reduces the amount of offset of the current in the remaining phases. Thus, once one of the AC circuit breakers has opened, the presence of the fault module 301 causes the other AC phases to experience zero crossings in current earlier than otherwise would be the case as described above. The resistive component 303 is connected in parallel with the energy storage elements so as to allow a path for a DC current to flow when necessary, e.g. to provide a path for any DC currents entering the transformer neutral point during normal operation. This means that the fault module does not interference with normal operation of the transformer but, during a fault condition can modify the current profiles of the AC phases as described above. The surge arrestor 304 is provided to protect the transformer neutral and also to limit the limit the electrical stresses on the capacitor and resistor.

To illustrate the advantages of embodiments of the present invention, operation of a conventional VSC arrangement such as illustrated in FIG. 2 were simulated and compared to operation of the arrangement illustrated in FIG. 3.

Figure 4A:
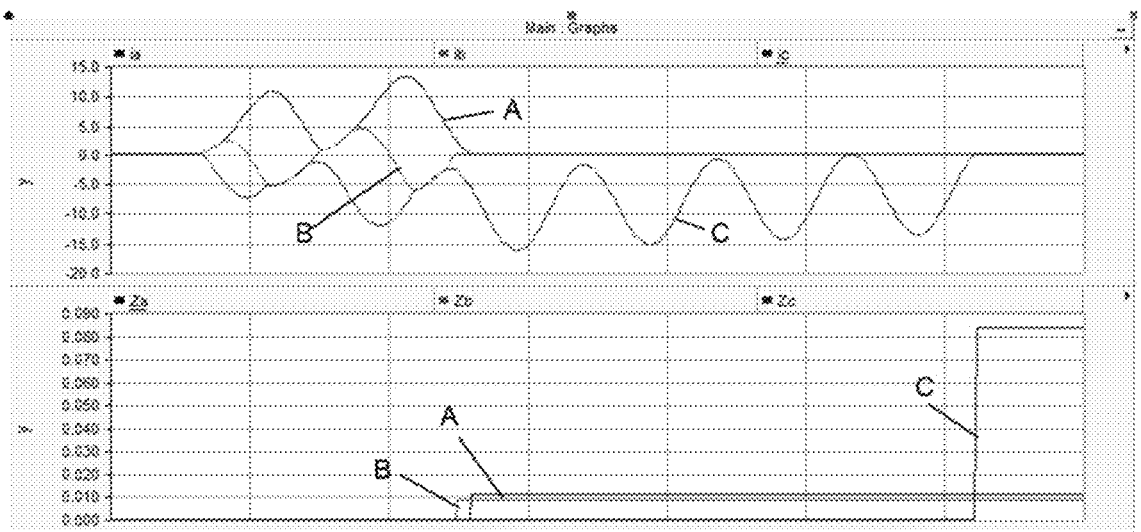
FIGS. 4a and 4b illustrate plots of current and impedance through an AC breaker during a fault for a conventional connection and via interface apparatus according to an embodiment.

FIG. 4a illustrates the current and impedance values through the circuit breakers 108 of each of the phases A, B and C in response to a detected fault using conventional fault handling methods. The top plot of FIG. 4a shows the AC current waveforms and the bottom plot shows the impedance of the circuit breakers. As described above when a fault, such as a single-phase-to-ground fault, occurs one of the phases will still experience a zero-crossing of current. In the example illustrated in FIG. 4a, phase B continues to experience a zero-crossings. If all three AC circuit breakers are commanded to open then circuit breaker 108b would open first. Closing the AC breaker 108b reduces the current offset of the other phase and phase A experiences a zero crossing shortly thereafter. However, the current of phase C still has a significant DC offset and undergoes several cycles before it experiences a zero-crossing when the circuit breaker 108c can halt conduction. The time taken to fully extinguish the fault current is thus relatively long and the AC circuit breaker for phase C experiences a substantial period of arcing, of greater than 40 ms.

Figure 4B:
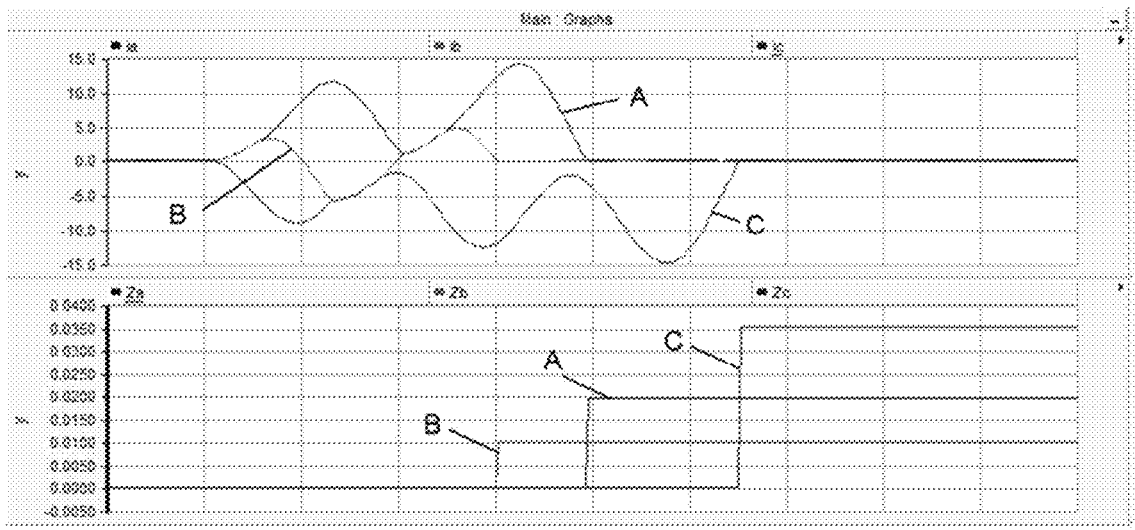

FIG. 4b illustrates the current and impedance values through the circuit breakers 108 of each of the phases A, B and C in response to a detected fault using embodiments of the present disclosure. FIG. 4b again shows AC current through the AC circuit breaker of each phase in the top plot and impedance of the circuit breaker in the bottom plot. As in the previous example a fault such as a single-phase-to-ground fault is detected and all AC circuit breakers are commanded to open. Phase B again experiences a zero-crossing of current and thus circuit breaker 108b is the first to fully open. However, in this example once circuit breaker 108b opens the voltage imbalance at the neutral point induces a current to/from transformer fault module 301, which, as described, reduces the impact of the DC offset due to the fault current. In this example phase A again experiences a zero-crossing shortly after the circuit breaker for phase B opens. As can be clearly seen however, in this instance Phase C undergoes far fewer cycles before experiencing a zero-crossing in current. The earlier zero-crossing extinguishes any current flow across the relevant circuit breaker much sooner than the conventional approach, thus reducing the risk of a fault current causing damage to the various components of the system.

Figure 5A:
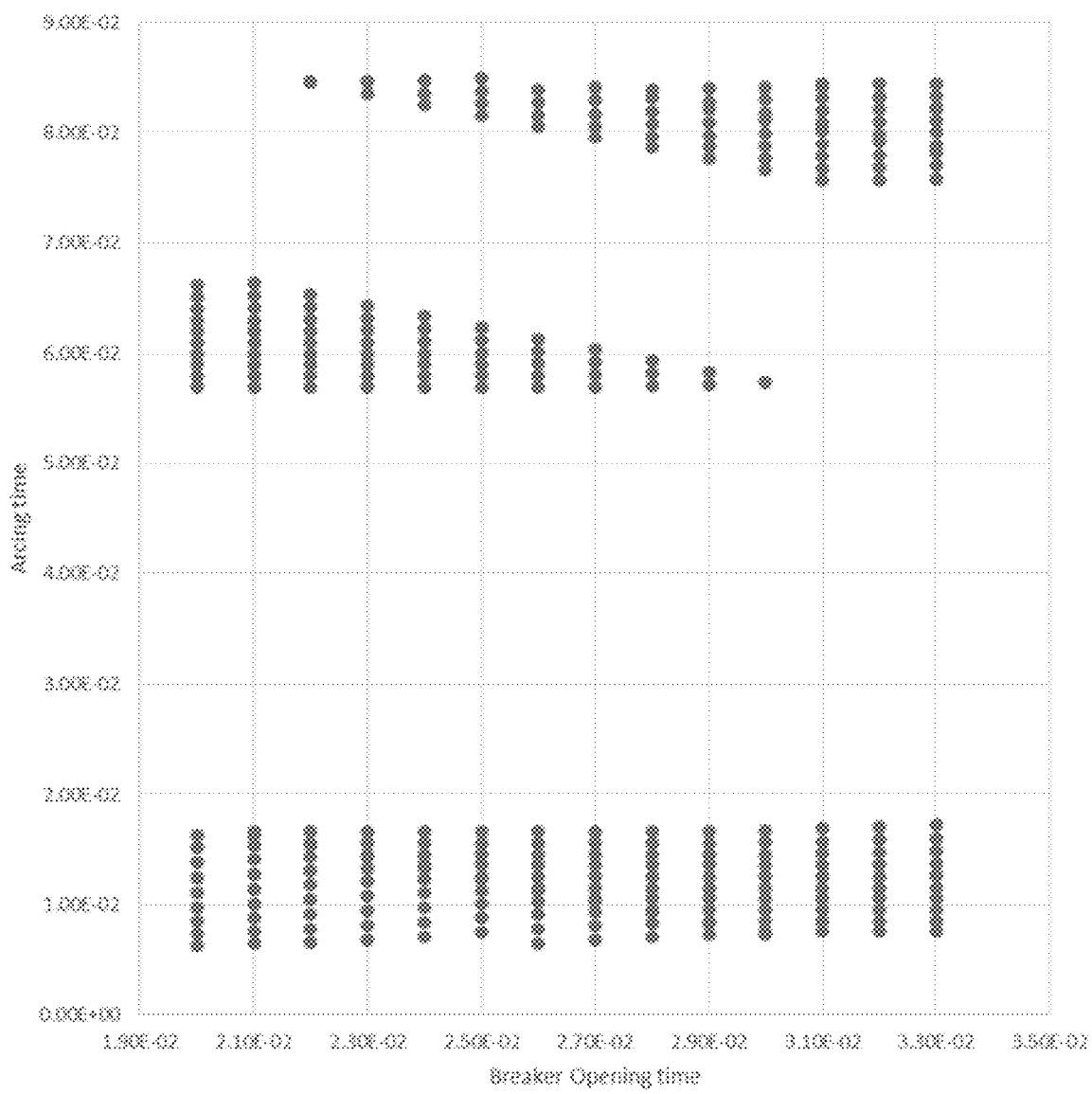
FIGS. 5a and 5b illustrate plots of breaker opening time against arcing time for an AC breaker.
Figure 5B:
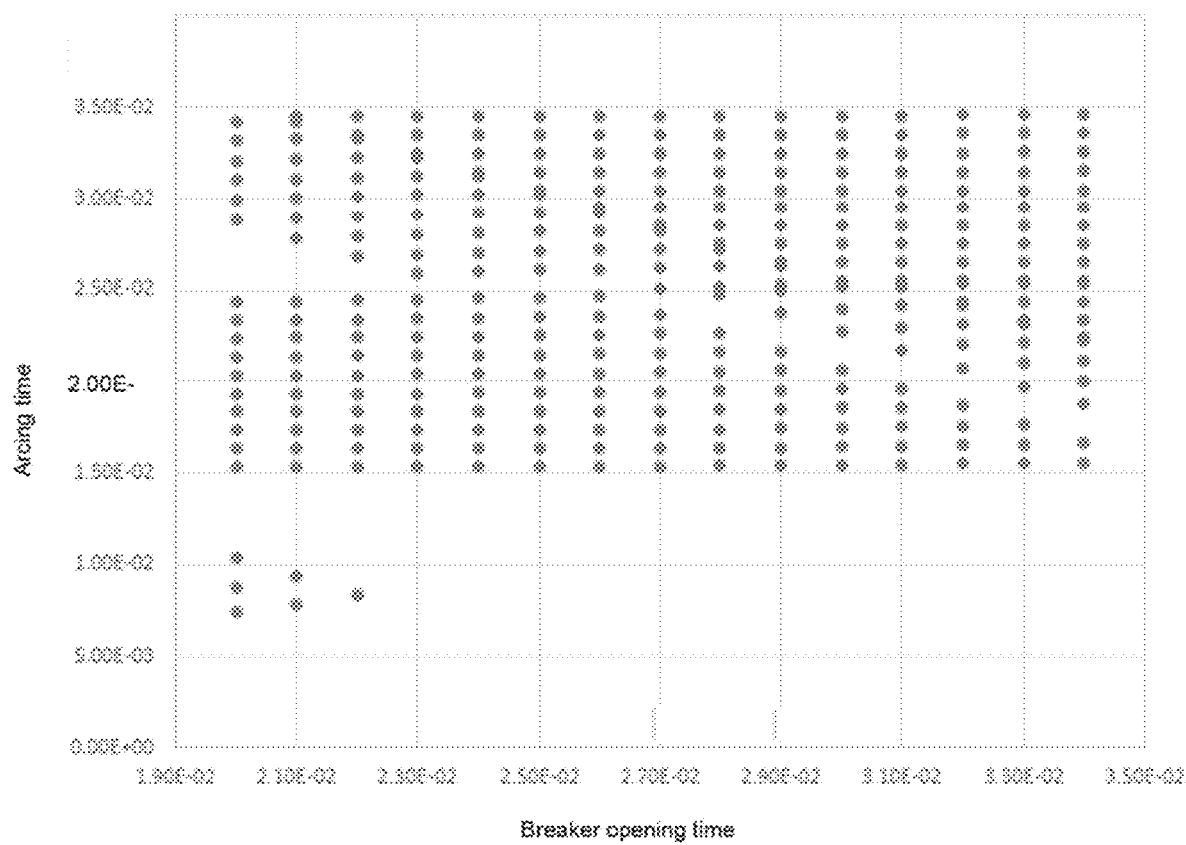

FIGS. 5a and 5b illustrate plots of breaker opening time against arcing time during a fault for different times of opening of the AC circuit breakers at different points in the AC cycle. It will be understood that the time taken for an AC breaker to actually open may vary. FIGS. 5a and 5b thus consider a number of different breaker opening times (fourteen in this example at 1 ms intervals) and for a fault occurring at a given point in the AC cycle determines the resultant arcing time for the worst case AC phase. Each point thus represents the resultant arcing time for a given breaker opening time for a fault occurring at a given point in the AC cycle. FIG. 5a shows the response from the circuit breakers using conventional fault handling methods for a VSC. It can be seen the arcing time for the various AC circuit breakers can vary significantly and the arcing times for at least one of the AC circuit breakers can be as high as 85 ms or so. FIG. 5b illustrates breaker opening time against arcing time for a system with a transformer fault module according to an embodiment of the present disclosure. In this case, the worst case arcing time of a circuit breaker is less than 40 ms and, in this example, does not exceed about 36 ms. This reduced arcing time extinguishes the current across a breaker more quickly, which puts less strain on the circuit breaker and decreases the risk of damage.

Embodiments thus provide an apparatus and methods for fault handling in a VSC system. An interface apparatus includes a fault module with passive components, an energy storage element and a resistive element, connected in parallel on the primary side of the transformer, between a neutral point of the transformer and a reference, e.g. ground. Embodiments with such a fault module may be implemented in any type of HVDC scheme, for instance for a VSC forming part of a bipole arrangement as illustrated in FIG. 1 or a symmetric monopole system. Embodiments of the disclosure allow a fault controller to simply issue an open command to all AC circuit breakers in the event of a fault and ensure earlier induced zero-crossings of current in AC phases and with reduced arcing time across a circuit breaker. Embodiments thus isolate an AC power network from a VSC experiencing a fault in a quick and efficient manner. This reduces the risk of any fault current damaging components of the HVDC system and in particular reduces the strain that could be potentially experienced across circuit breakers.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. An interface apparatus for interfacing between an AC system and a DC system, the apparatus comprising:
a transformer having a set of windings for coupling to a plurality of AC phases (A, B, C) of the AC system, the set of windings having a neutral point (N), wherein the plurality of AC phases comprises at least a first AC phase and one or more other AC phases with different phase offsets from the first AC phase;
a plurality AC circuit breakers, one for each of the AC phases of the AC system, wherein a first AC circuit breaker is associated with the first AC phase and one or more other circuit breakers are associated with the one or more other AC phases;
a fault module comprising an energy storage element connected in parallel with a passive resistive element providing a path for any DC currents entering the neutral point between a first module node and a second module node;
the first module node being electrically connected to the neutral point of the set of windings and the second module node connected to a reference node held, in use, at a reference voltage; and
a fault controller for operating said AC circuit breakers that is configured to, responsive to a phase-to-ground fault:
simultaneously issue an open command to each of the plurality of the AC circuit breakers; and
once the first AC circuit breaker is opened, the fault module is configured to:
cause a non-zero voltage to be developed across the energy storage element and the passive resistive element;
induce a current to flow in the one or more other AC phases of the one or more other AC circuit breakers that have not yet opened that modulates current profile(s) of the one or more other phases; and
open one or more of the other AC circuit breakers after the one of the AC circuit breakers has opened and at a time when the one or more other AC circuit breakers experience zero-crossings in current.

2. The interface apparatus as claimed in claim 1 wherein the fault module comprises a surge arrestor electrically connected between the first and second module nodes in parallel with said energy storage element and said passive resistive element.

3. The interface apparatus as claimed in claim 1 wherein the energy storage element comprises at least one capacitor.

4. The interface apparatus as claimed in claim 1 wherein said set of windings of the transformer is a primary set of windings of the transformer.

5. The interface apparatus as claimed in claim 4 further comprising a set of secondary windings of the transformer for coupling to a plurality of phase limbs of a voltage source converter.

6. The interface apparatus as claimed in claim 5 wherein, in the event of a phase-to-ground fault in any of: the set of secondary windings; a phase limb of the voltage source converter or the connection between the set of secondary windings and a phase limb of the voltage source converter, the fault controller is configured to command the AC circuit breakers to open.

7. The interface apparatus as claimed in claim 5 wherein the voltage source converter is configured as part of a bipole power transmission system.

8. The interface apparatus as claimed in claim 5 wherein the voltage source converter is configured as part of a high-voltage direct-current (HVDC) power transmission system.

9. A method of fault handling for a power distribution network, the method comprising:
   during normal mode of operation, operating a voltage source converter to exchange electrical power with an AC system having multiple electrical phases (A, B, C) via an interface apparatus, the interface apparatus comprising a transformer comprising a set of primary windings connected to the electrical phases of the AC system and a set of secondary windings connected to the voltage source converter, wherein the multiple electrical phases comprises at least a first phase and one or more other phases with different phase offsets from the first phase;
   wherein the interface apparatus further comprises a fault module comprising an energy storage element connected in parallel with a passive resistive element providing a path for any DC currents entering the neutral point between a reference voltage and a neutral point of one of the set of primary windings or the set of secondary windings;
   the method further comprising monitoring, by a fault controller, for a fault and, upon detecting a fault:
   simultaneously issuing an open command to each of a plurality of the AC circuit breakers, one for each of the multiple electrical phases, wherein a first AC circuit breaker is associated with the first phase and one or more other circuit breakers are associated with the one or more other phases; and
   once the first AC circuit breaker is opened:
      causing a non-zero voltage to be developed across the energy storage element and the passive resistive element;
      inducing a current to flow in the one or more other electrical phases of the one or more other AC circuit breakers that have not yet opened that modulates current profile(s) of the one or more other phases; and
      opening one or more of the other AC circuit breakers after the one of the AC circuit breakers has opened and at a time when the one or more other AC circuit breakers experience zero-crossings in current.

10. The method as claimed in claim 9 wherein said fault is a phase-to-ground fault in any of: the set of secondary windings; a phase limb of the voltage source converter or the connection between the set of secondary windings and a phase limb of the voltage source converter.

11. The method as claimed in claim 9 wherein, in the event of a fault the method further comprises generating a command to block the voltage source converter.

12. The method as claimed in claim 9 wherein the fault module further comprises a surge arrestor electrically connected in parallel with said energy storage element and said passive resistive element.

* * * * *